United States Patent
Nelson (10) Patent No.: US 7,164,352 B2
(45) Date of Patent: Jan. 16, 2007

(54) SAFETY WARNING SYSTEM FOR A VEHICLE AND CORRESPONDING METHOD FOR OPERATING THE SAME

(76) Inventor: Riley H. Nelson, 5504 Alhambra Dr., Orlando, FL (US) 32808

( * ) Notice: Subject to any disclaimer, the term of this patent is extended or adjusted under 35 U.S.C. 154(b) by 160 days.

(21) Appl. No.: 10/928,462

(22) Filed: Aug. 27, 2004

(65) Prior Publication Data

US 2005/0046596 A1   Mar. 3, 2005

Related U.S. Application Data

(60) Provisional application No. 60/498,410, filed on Aug. 28, 2003.

(51) Int. Cl.
*B60Q 7/02*  (2006.01)
(52) U.S. Cl. .................. 340/472; 340/908; 40/610; 40/612
(58) Field of Classification Search ............... 340/908, 340/908.1, 472; 116/63 R, 63 P, 63 C, 63 T; 40/571, 610, 612
See application file for complete search history.

(56) References Cited

U.S. PATENT DOCUMENTS

| | | | | |
|---|---|---|---|---|
| 4,825,192 | A * | 4/1989 | Wells | 340/433 |
| 5,406,251 | A | 4/1995 | Leis | 340/433 |
| 5,647,719 | A * | 7/1997 | Bowlen | 414/462 |
| 5,781,120 | A * | 7/1998 | Kucik | 340/425.5 |
| 6,213,047 | B1 * | 4/2001 | Means et al. | 116/28 R |
| 6,412,203 | B1 * | 7/2002 | Libhart et al. | 40/591 |
| 6,535,117 | B1 | 3/2003 | Haerer | 340/473 |
| 6,683,532 | B1 | 1/2004 | Peet, II et al. | 340/321 |

\* cited by examiner

*Primary Examiner*—Jeffery Hofsass
*Assistant Examiner*—Hoi C. Lau
(74) *Attorney, Agent, or Firm*—Allen, Dyer, Doppelt, Milbrath & Gilchrist, P.A.

(57) ABSTRACT

A safety warning system for a vehicle includes a housing carried by the vehicle, and a telescoping extension member carried by the housing. The telescoping extension member has a retracted position for storage within the housing and an extended position for extending along the ground. Safety reflectors are carried by the telescoping extension member, and the safety reflectors are spaced apart along the ground when the telescoping extension member is in the extended position so that the safety reflectors are visible to oncoming traffic. A controller within a passenger area of the vehicle allows the driver to operate the telescoping extension member between the retracted position and the extended position.

39 Claims, 10 Drawing Sheets

SAFETY WARNING SYSTEM FOR A VEHICLE AND CORRESPONDING METHOD FOR OPERATING THE SAME

RELATED APPLICATION

This application claims the benefit of U.S. Provisional Application Ser. No. 60/498,410 filed Aug. 28, 2003, the entire contents of which are incorporated herein by reference.

FIELD OF THE INVENTION

The present invention relates to the field of highway safety devices, and more particularly, to a safety warning system for alerting oncoming traffic that a vehicle has stopped or become disabled along a highway.

BACKGROUND OF THE INVENTION

When a vehicle stops or breaks down along the side of a highway, a hazardous condition is created. The vehicle is either repaired or abandoned near the side of the highway as oncoming motorist continue to speed by. A number of safety devices have been devised which give oncoming motorists an early warning as to the road hazard created by such a breakdown.

Among the types of warning devices commonly used are standard highway safety triangles. These safety triangles are reflective and include a lower base and an upper, frequently collapsible, triangular-shaped device. The triangle is a well known safety or hazard warning symbol. In many states, it is a legal requirement that trucks be equipped with such deployable safety triangles for use during a breakdown or an accident to warn oncoming motorist of the approaching hazard.

There is also a concern for the safety of the driver of the disabled vehicle when placing the safety triangles along the highway. The driver is placing himself at a heightened risk in order to position the safety triangles behind the disabled vehicle. In addition, the safety triangles may be knocked over after being placed on the ground due to strong winds, or due to a passing motorist driving to close to the safety triangles.

SUMMARY OF THE INVENTION

In view of the foregoing background, it is therefore an object of the present invention to position safety reflectors on the ground behind a disabled vehicle to warn oncoming motorist without placing the driver at risk.

This and other objects, features, and advantages in accordance with the present invention are provided by a safety warning system for a vehicle comprising a safety apparatus carried by the vehicle, and a controller for operating the safety apparatus. The controller is preferably in a passenger area of the vehicle.

The safety apparatus may comprise a housing, and at least one telescoping extension member carried by the housing. The at least one telescoping extension member has a retracted position for storage within the housing and an extended position for extending along the ground. A plurality of safety reflectors may be carried by the at least one telescoping extension member. The plurality of safety reflectors are spaced apart along the ground when the at least one telescoping extension member is in the extended position so that the plurality of safety reflectors are visible to oncoming traffic. The controller may operate the at least one telescoping extension member between the retracted position and the extended position. The controller may operate the safety apparatus via a wired or wireless connection.

When the vehicle stops, becomes disabled or the driver simply needs to pull off to the side of the highway, then the driver operates the controller without exiting the vehicle after pulling off the highway. This advantageously permits the driver of the vehicle to position the safety reflectors on the ground behind the vehicle to warn oncoming motorist without placing himself at risk.

The safety apparatus may further comprise a support frame connected to the vehicle, and at least one lowering device connected to the support frame for lowering the housing to the ground prior to the at least one telescoping extension member being placed in the extended position. The at least one lowering device operates in response to the controller. The safety apparatus may further comprise a warning indicator carried by the housing for providing an audible warning indicating that the housing is to be lowered to the ground.

The housing is preferably enclosed and includes a door. The safety apparatus may further comprise a door opening device within the housing that operates in response to the controller for opening the door to expose the at least one telescoping extension member.

More particularly, the at least one telescoping extension member may comprise a single telescoping extension member, and the plurality of safety reflectors may include a plurality of inner-positioned safety reflectors and an outer-positioned safety reflector. The outer-positioned safety reflector may be attached to an end of the at least one telescoping extension member and comprises at least one roller for assisting in travel thereof along the ground. The telescoping extension member may comprise a plurality of telescoping sections, with each telescoping section extending from a previous telescoping section except for a first telescoping section. Each inner-positioned safety reflector may have an opening so that at least one of the telescoping sections extends therethrough, and a size of each opening corresponds to a size of a particular telescoping section so that as the telescoping extension member is placed in the extended position, the plurality of inner-positioned safety reflectors are spaced a predetermined distance apart along the ground.

In another embodiment, the at least one telescoping extension member may comprise a pair of telescoping extension members, and the plurality of safety reflectors may be carried by the pair of telescoping extension members. A skid plate may be connected to ends of the pair of telescoping extension members for assisting in travel thereof along the ground.

In this particular embodiment, a belt may be attached to the skid plate and extends between the pair of telescoping extension members. The plurality of safety reflectors may be on the belt when the pair of telescoping extension members is in the extended position. The safety apparatus may further comprise at least one roller carried by the housing for storing the belt thereon when the pair of telescoping extension members is in the retracted position. Moreover, the plurality of safety reflectors may be stored in the housing in an accordion-like fashion.

The safety warning system may further comprise a telescoping support member carried by the vehicle. The telescoping support member may have a retracted position for storage and an extended position. The telescoping support member may comprise at least one coupling member for coupling to the at least one telescoping extension member so that the at least one telescoping extension member travels in a predetermined direction when placed in the extended position. In other words, the telescoping support member prevents the telescoping extension member from curving onto the highway and becoming a hazard to itself.

The safety warning system may further comprise an optical device carried by the housing for projecting an image of at least one safety reflector on the ground if the at least one telescoping extension member is not able to be placed in the extended position. Each safety reflector may have a triangular shape, and to better warn oncoming motorist, the safety reflectors may comprise at least one illuminated indicia.

Another aspect of the present invention is directed to a method for operating the safety warning system as described above. The method comprises stopping the vehicle, and then operating the telescoping extension member from the retracted position to the extended position based upon the controller. The safety reflectors are spaced apart along the ground when the telescoping extension member is in the extended position so that the safety reflectors are visible to oncoming traffic.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1–4, the illustrated safety warning system 20 comprises a safety apparatus 22, and a controller 24 for remotely operating the safety apparatus in a vehicle 30. The vehicle 30 may be a tractor-trailer truck including a cab 30a and a trailer 30b, as illustrated. Of course, the safety warning system 20 may be installed in trucks other than tractor-trailer trucks, such as utility-type trucks, as well as being installed in automobiles, as readily appreciated by those skilled in the art.

The safety apparatus 24 comprises a housing 40 carried by the trailer 30b, and at least one telescoping extension member 42 carried by the housing. The telescoping extension member 42 has a retracted position for storage within the housing 40 and an extended position extending rearwardly from the trailer 30b.

A plurality of safety reflectors 44 are carried by the telescoping extension member 42. The safety reflectors 44 are spaced apart when the telescoping extension member 42 is in the extended position so that they are visible to oncoming traffic. The controller 22 is positioned within a passenger area of the cab 30a for operating the telescoping extension member 42 between the retracted position and the extended position.

If the tractor-trailer truck 30 becomes disabled or the driver needs to pull off to the side of the highway, then the driver operates the controller 22 from the passenger area of the cab 30a after pulling off the highway. To position the safety reflectors 44 along the ground behind the trailer 30b, as series of steps are performed.

The housing 40 is first lowered to the ground, and a door 46 is opened. Once the door 46 is opened, the telescoping extension member 42 is extended for positioning the safety reflectors 44 along the ground behind the trailer 30b. The safety warning system 20 thus prevents the driver from being subjected to a heightened risk associated with manually placing the safety reflectors 44 on the ground behind the trailer 30b as motorist are speeding by. Moreover, since the safety reflectors 44 are rigidly carried by the telescoping extension member 42, they will not fall over once they are positioned on the ground due to strong winds or to a passing motorist driving to close.

Figure 2:
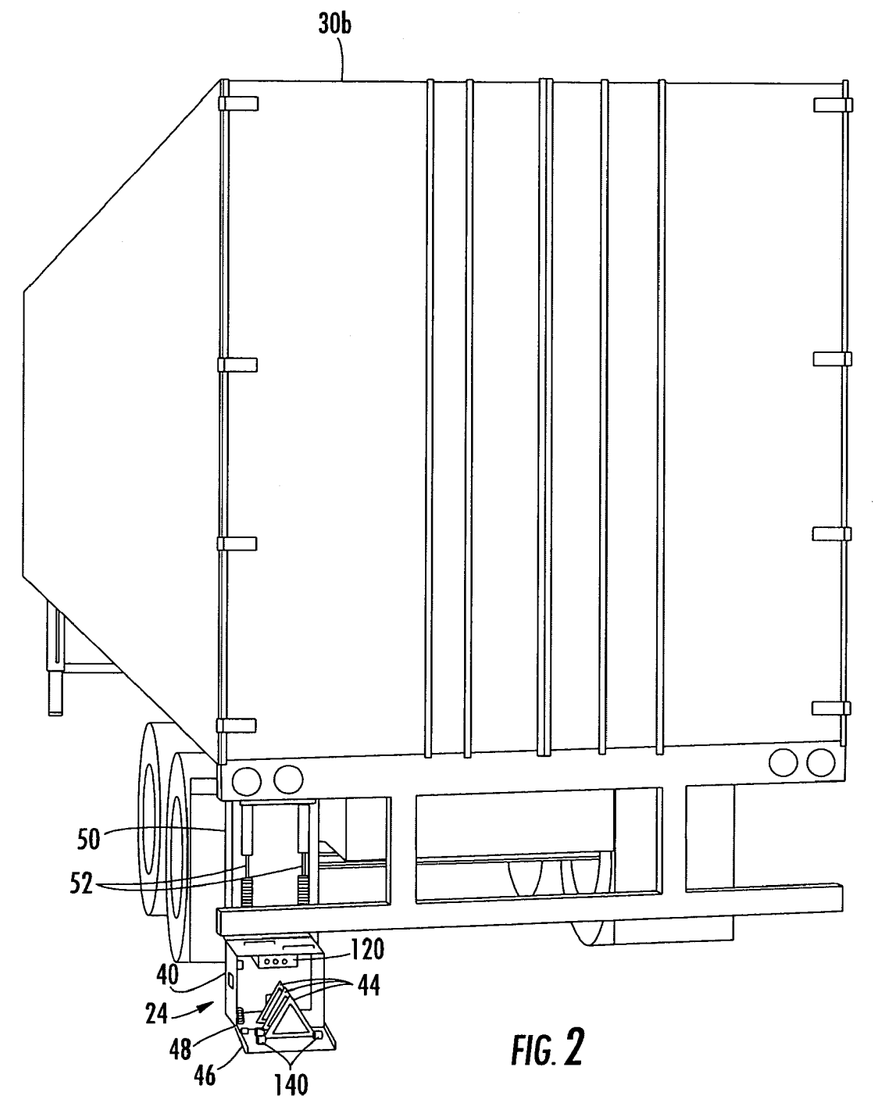
FIG. 2 is a perspective view of the rear of the trailer from FIG. 1 with the housing of the safety warning system lowered to the ground.
Figure 3:
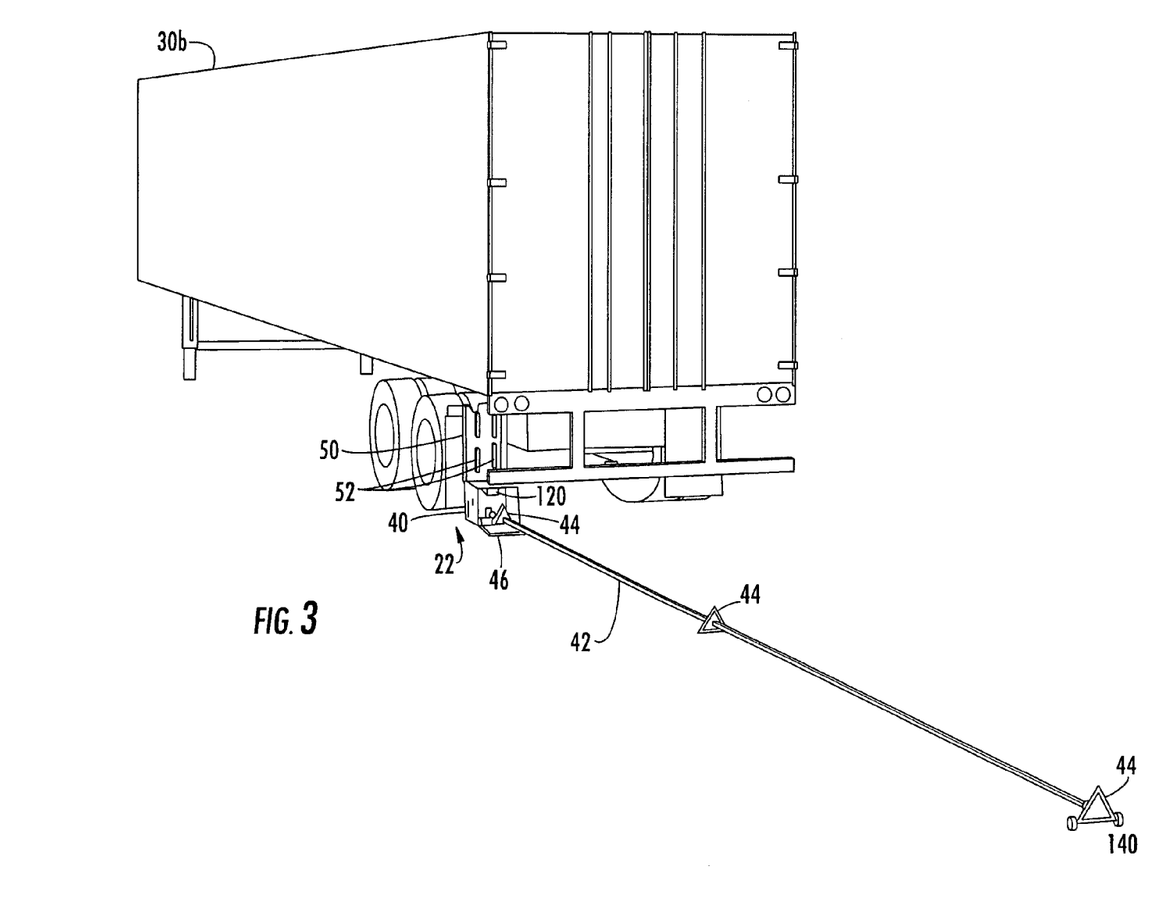
FIG. 3 is a perspective view of the telescoping extension member from FIG. 2 in the extended position so that the safety reflectors are spaced apart on the ground.
Figure 4:
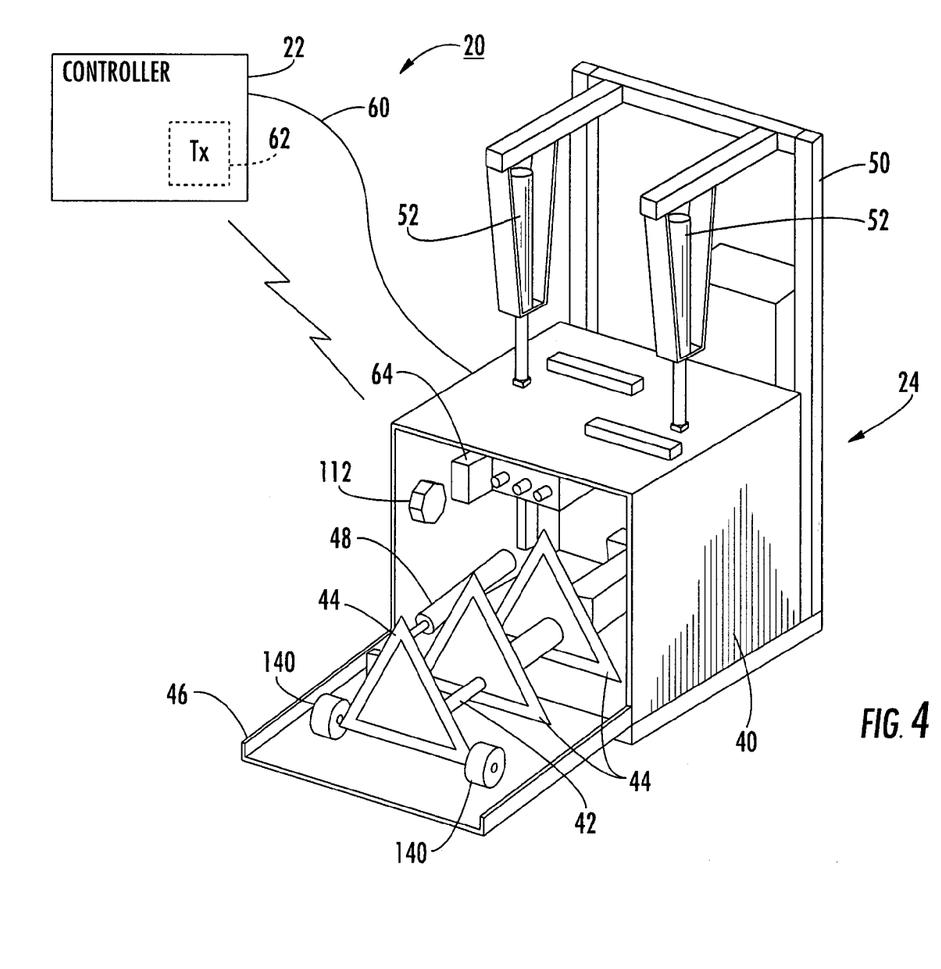
FIG. 4 is a perspective view of the safety warning system in accordance with the present invention.

The safety apparatus 24 further comprises a support frame 50 connected to the trailer 30b, and at least one lowering device 52 carried by the support frame. The illustrated lowering device 52 includes a pair of lowering devices coupled to the housing 40. The pair of lowering devices 52 lower the housing 40 to the ground prior to the telescoping extension member 42 being placed in the extended position. The lowering devices 52 may be pivotly attached to the housing 40 so that positioning of the housing 40 on the ground allows for any roughness or unevenness of the ground.

The housing 40 is enclosed to protect the telescoping extension member 42 when in the retracted position as well as protecting the safety reflectors 44. The housing 40 includes a door 46 that is opened after the housing has been lowered to the ground. Once the housing 40 is on the ground, a door opening device 48 opens the door 46 and the telescoping extension member 42 is placed in the extended position so that the safety reflectors 44 are positioned on the ground, as illustrated in FIG. 3.

The controller 22 allows the driver of the truck 30 to remain in the cab 30a when operating the safety apparatus 24. The controller 22 may be hardwired to the safety apparatus 24 via an electrical cable 60, as illustrated in FIG. 4. Alternatively, the controller 22 may be wirelessly connected to the safety apparatus 24 also illustrated in FIG. 4. In the wireless embodiment, the controller 22 includes a transmitter 62 for transmitting control signals to a receiver/controller 64 in the housing 40. Outputs of the receiver/controller 64 are then directed for initiating particular features of the safety apparatus 24, as will be described in greater detail below.

The safety warning system 20 operates off of dc power and compressed air as commonly found on a tractor-trailer truck 30. The dc power is 12 volts dc and the compressed air is approximately 40 psi, for example. The compressed air is used to operate a number of different air cylinders in response to the controller 22. As an alternative to the air cylinders, electric motors may be used, particularly for vehicles that do not operate with compressed air, such as automobiles.

Figure 5:
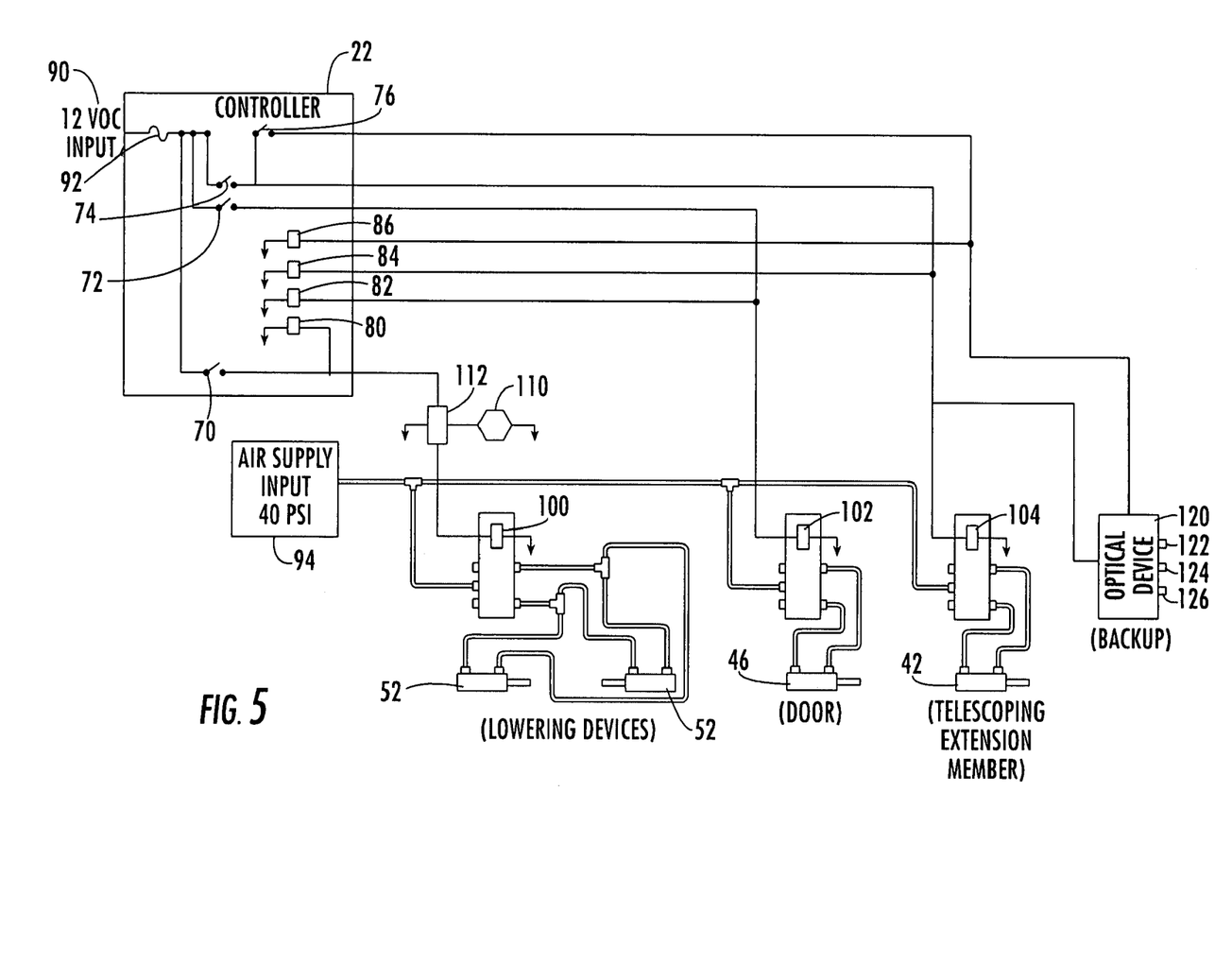
FIG. 5 is a schematic diagram of the safety warning system in accordance with the present invention.

Referring now to FIG. 5, the controller 22 in the passenger area of the cab 30*a* includes a plurality of switches 70–76 as well as a plurality of indicator lights 80–86. The controller 22 is connected to a 12 volt dc power source 90, e.g., the vehicle's battery, via a fuse 92. Alternatively, the safety warning system 20 may have its own power supply source. The compressed air for the safety apparatus 24 may be provided by the compressed air 94 typically available on a tractor-trailer truck 30.

A lowering switch 70 is used to energize an air valve 100 for operating the pair of lowering devices 52, which are air cylinders. The pair of lowering devices 52 are used to lower the housing 40 to the ground. An indicator light 80 on the controller 22 is lit to indicate that the safety apparatus 24 is being operated.

Prior to lowering the housing 40, a warning indicator 110, such as a buzzer, is activated to indicate that the safety apparatus 24 is about to lower the housing 40. The buzzer 110 operates for about 3 to 5 seconds before the housing 40 is lowered to the ground. When a timer 112 has timed out the 3 to 5 seconds, an electrical signal is sent to an air valve 100 for allowing compressed air to operate the pair of air cylinders 52 for lowering the housing 40 to the ground.

A door switch 72 is used to energize an air valve 102 for operating the door opening device 48, which is another air cylinder. The air cylinder 48 opens the door 46. An indicator light 82 on the controller 22 is lit to indicate that the door 46 is open.

A safety reflector switch 74 is used to energize an air valve 104 for operating the telescoping extension member 42, which is also another air cylinder. The air cylinder 42 causes the telescoping extension member to move to the extended position, which in turn cause the safety reflectors 44 to be positioned on the ground behind the trailer 30*b*. An indicator light 86 on the controller 22 is lit to indicate that the telescoping extension member 42 is extended.

To return the telescoping extension member 42 to the retracted position within the housing 40, the switch 74 on the controller is opened and once the telescoping extension member 42 is in the retracted position, the corresponding light 84 on the controller is no longer lit. Similar steps are followed for closing the door 46, and for lifting the housing 40 off of the ground. Alternatively, the controller 22 and safety apparatus 24 may be configured to operate using a single switch for placing the safety reflectors 44 along the ground via the telescoping extension member 42.

Figure 11:
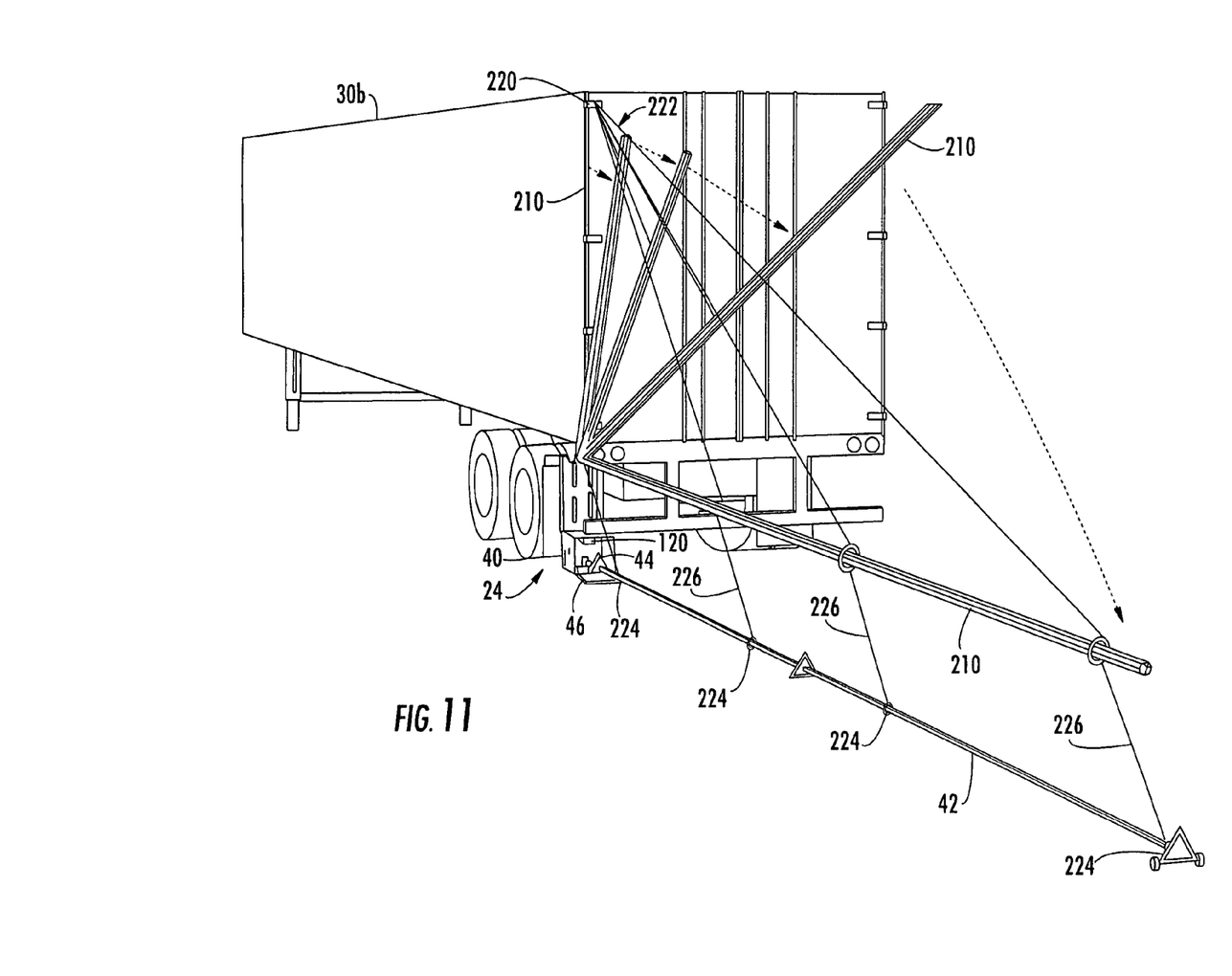
FIG. 11 is a perspective view of the rear of the trailer with a telescoping support member being positioned for coupling to the telescoping extension member in accordance with the present invention.

As a backup to the telescoping extension member 42 not being operational due mechanical problems, the driver has the option of activating a backup switch 76. The backup switch 76 activates an optical device 120 carried by the housing for projecting images 130–134 of safety reflectors on the ground behind the trailer 30*b*, as illustrated in FIG. 11. Light 86 is lit when the optical device 120 is operating. The optical device 120 comprises a separate imaging output 122-126 for each image. The image may be in the form of a triangle, for example. Generation of optical images 130–134 without a backdrop is readily understood by those skilled in the art and will not be discussed in further detail. Alternatively, in other embodiments, the optical device 120 may be operated even if the telescoping extension member 42 is functional.

Still referring to FIGS. 2–4, the illustrated telescoping extension member 42 comprises a single telescoping extension member. The safety reflectors 44 include a plurality of inner-positioned safety reflectors and an outer-positioned safety reflector. The outer-positioned safety reflector 44 is attached to an end of the telescoping extension member 42, and comprises at least one roller 140 for assisting in travel thereof along the ground.

More particularly, the telescoping extension member 42 comprises a plurality of telescoping sections, with each telescoping section extending from a previous telescoping section except for the first telescoping section. Each inner-positioned safety reflector 44 has an opening so that at least one of the telescoping sections extends therethrough, and a size of each opening corresponds to a size of a particular telescoping section so that as the telescoping extension member 42 is placed in the extended position, the inner-positioned safety reflectors are spaced a predetermined distance apart along the ground.

The predetermined distance between the safety reflectors 44 may be 10 feet, for example, wherein the outer-positioned safety reflector 44 is 30 feet from the trailer 30*b*. This is based upon the safety reflector 44 closest to the trailer 30*b* also being spaced 10 feet out from the trailer.

As will be shown in other embodiments, there may be more than three safety reflectors 44 carried by the telescoping extension member 42. In addition, the actual length of the telescoping extension member 42 in the extended position may be different than 30 feet. However, 30 feet beyond the trailer 30*b* for the outermost safety reflector 44 with a separation of 10 feet between each of the other two safety reflectors is a preferred distance based upon known highway safety standards.

Figure 6:
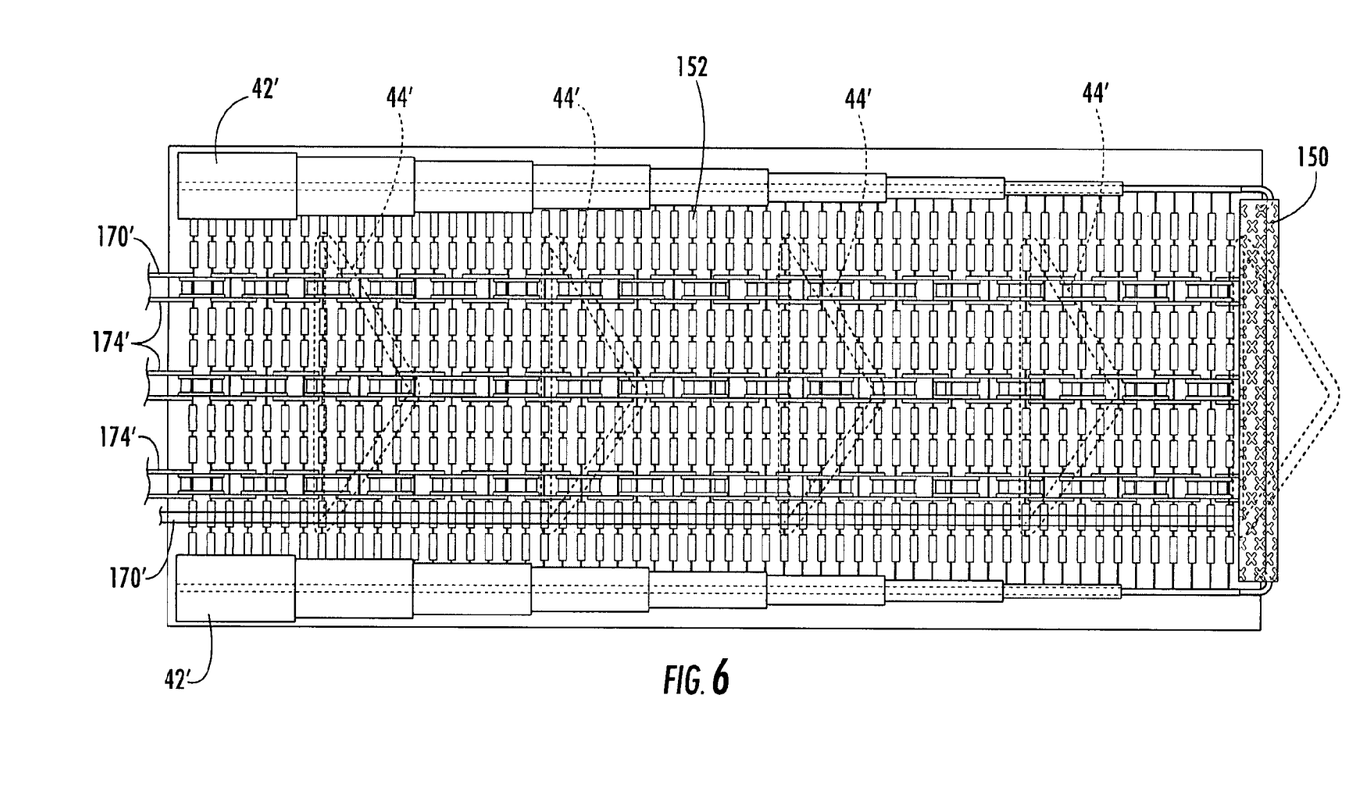
FIG. 6 is a top view of another embodiment of the telescoping extension members in accordance with the present invention.
Figure 7:
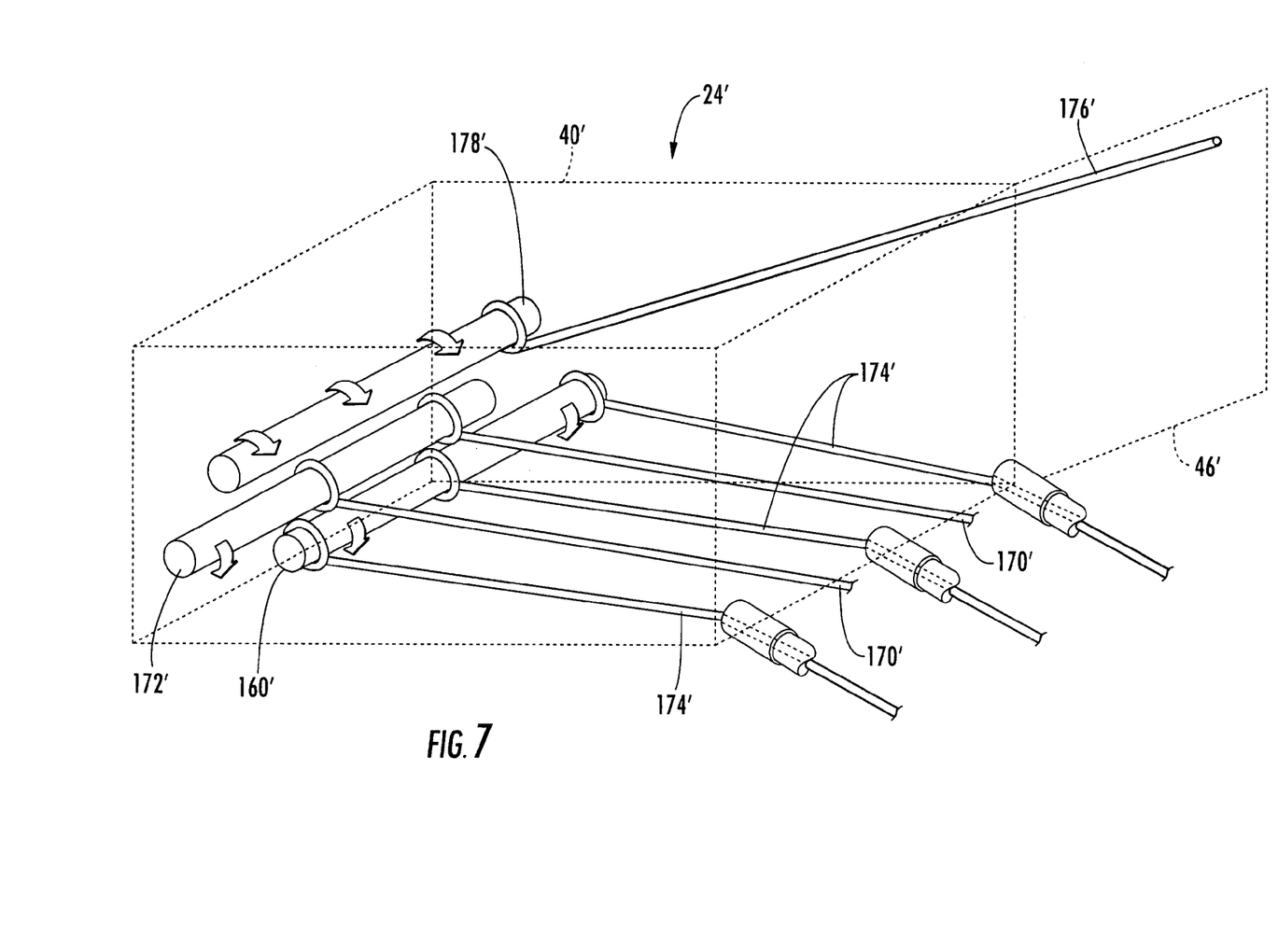
FIG. 7 is a partial sectional view of the housing supporting the telescoping extension members illustrated in FIG. 6.
Figure 8:
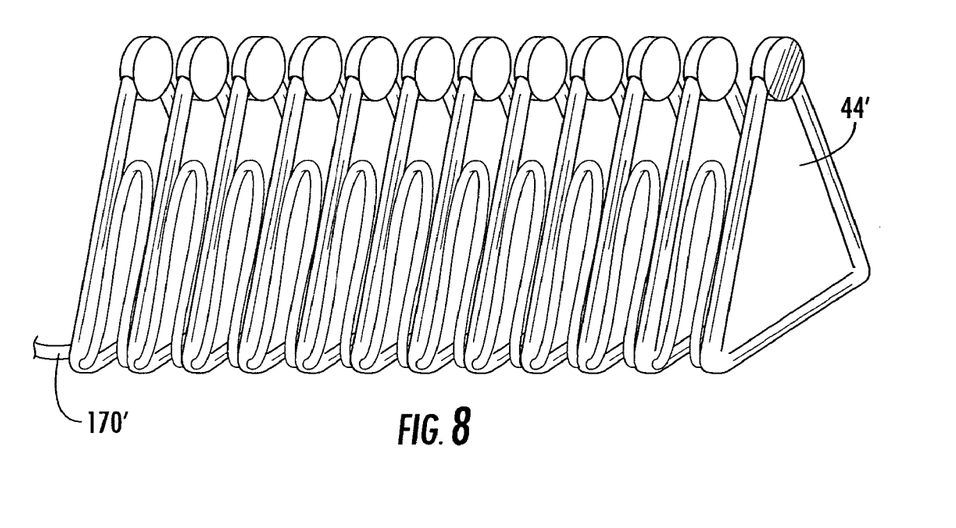
FIG. 8 is a side perspective view of the safety reflectors in a retracted position for storage within the housing illustrated in FIG. 7.

Referring now to FIGS. 6–8, another embodiment of the safety apparatus 24' will be discussed. In this embodiment, a pair of telescoping extension members 42' is used for positioning the safety reflectors 44' on the ground. A skid plate 150' is attached to the ends of the telescoping extension members 42'. The skid plate 150' slides along the ground as the telescoping extension members 42' are placed in the extended position. Attached to the skid plate 150' is a belt 152' which carries the safety reflectors 44', and as the telescoping extension members 42' are extended, the belt is also extended.

A roller 160' is used to unroll the belt 152' when the telescoping extension members 42' are being extended, as illustrated in FIG. 7. The belt 152' attaches to the roller 160' via cords 174'. Since the belt 152' is wrapped around the roller 160' in the stored position, the reflectors 44' are stored separately from the belt, such as in an accordion-type fashion as illustrated in FIG. 8. The outer-positioned safety reflector 44' is attached to the belt 152' or skid plate 150' so that as the belt is unrolled, the other safety reflectors are pulled out of the housing 40' at predetermined intervals.

A pair of cords 170' is coupled to the outer-positioned safety reflector 44' as well as to the other safety reflectors. The pair of cords 170' is used to hold the safety reflectors in an upright position and to also maintain the predetermined distance or separation between the safety reflectors when the telescoping extension members 42' are in the extended position. The pair of cords 170' is attached to a roller 172' within the housing 40'. The pair of cords 170' is also used to pull the telescoping extension members 42' from the extended position to the retracted positioned if there is a mechanical problem with the telescoping extension members 42' themselves. In addition, another cord 176 may be attached between the door 46' and a roller 178' for closing the door should the door opening device 48 fail.

The illustrated view of the safety apparatus 24' in FIG. 7 does not include all of the various elements for purposes of simplifying the figure. For instance, electric motors operating the illustrated rollers 160, 172, 178 are not shown, as well as the pair of telescoping extension members 42', which instead, are illustrated in FIG. 6.

Figure 9:
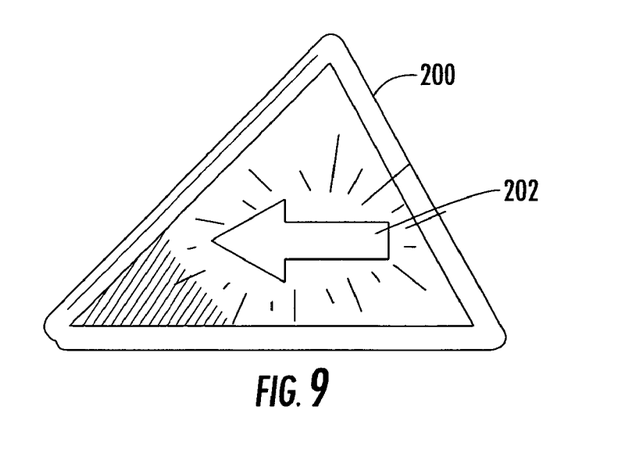
FIG. 9 is a front view of a safety reflector including an illuminated indicia in accordance with the present invention.
Figure 10:
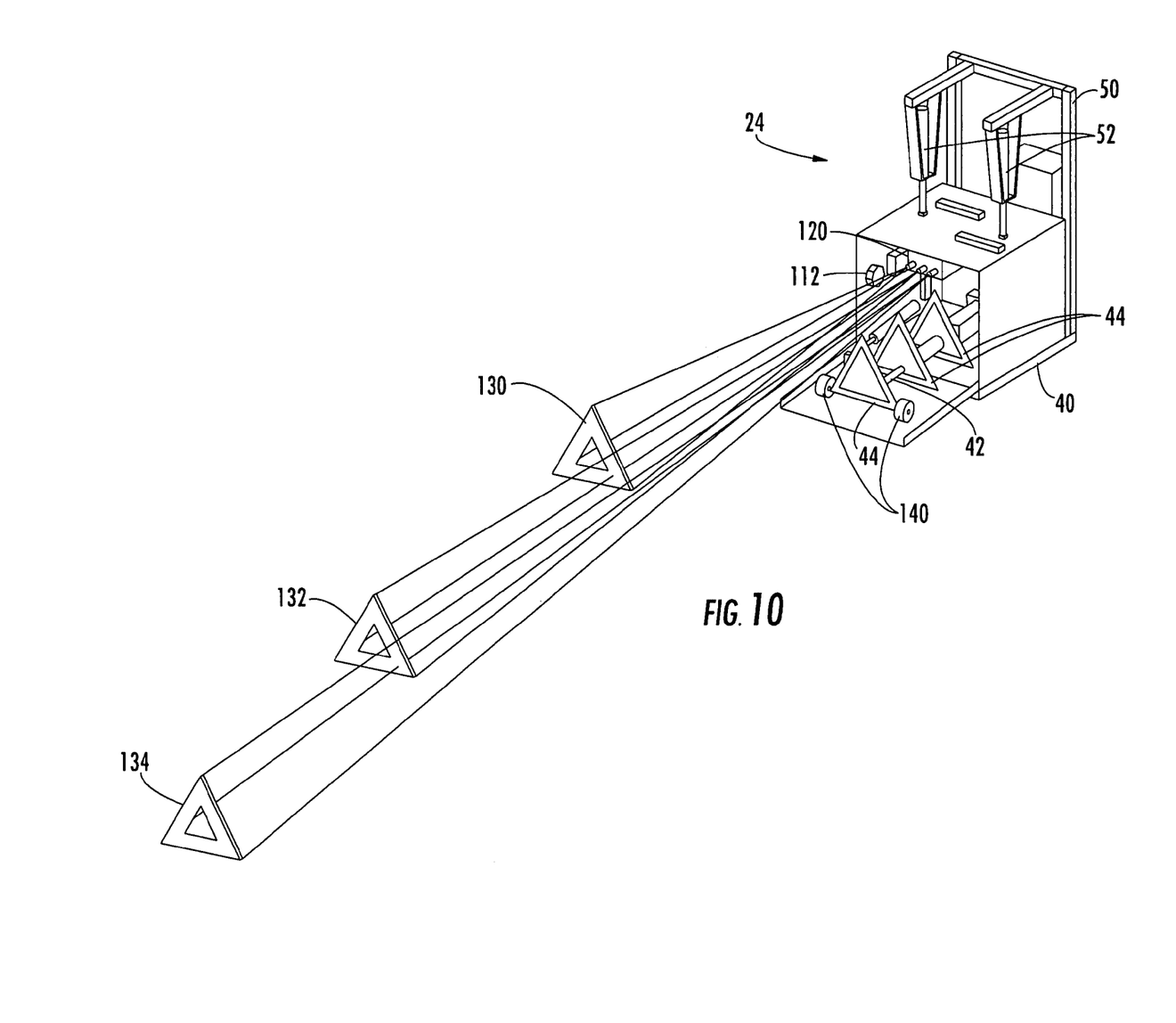
FIG. 10 is a perspective view of the optical device from the safety warning system projecting images of safety reflectors on the ground in accordance with the present invention.

To better warn oncoming traffic that the vehicle is pulled over along the side of the highway, each safety reflector 200 includes an illuminated indicia or indicator 202, as illustrated in FIG. 9. The indicators may be powered by individual batteries or they may be wired into the electrical system used by the safety apparatus 24. The illuminated indicator may be in the form of an arrow, as illustrated. Of course, other lighted symbols including letters may be used to warn oncoming motorist.

Figure 1:
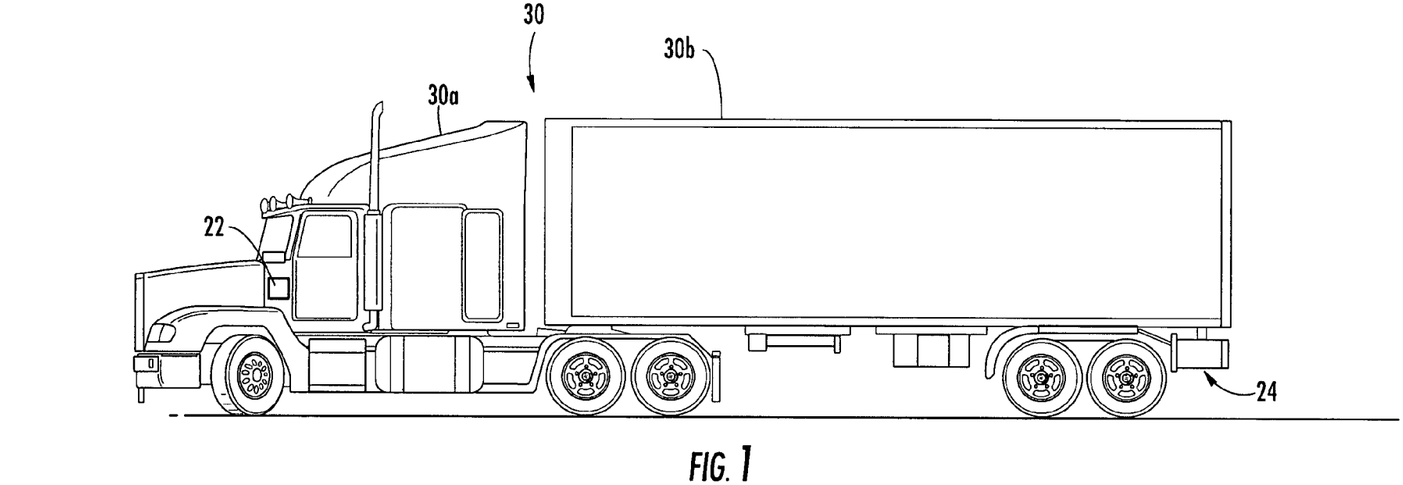
FIG. 1 is a side view of a tractor-trailer truck with a safety warning system in accordance with the present invention.

Referring now to FIG. 11, a telescoping support member 210 may also be provided to ensure that the telescoping extension member 42 as illustrated in FIGS. 1–3 maintains extension in a straight direction behind the vehicle when in the extended position. That is, the telescoping support member 210 prevents the telescoping extension member 42 from curving onto the highway and becoming a hazard itself.

The telescoping support member 210 may be stored in a vertical position, as illustrated in FIG. 11, or it may be stored in a horizontal position along the side of the trailer 30b. When stored in the vertical position, a pulley system 220 including cables 222 is used to lower the telescoping support member 210 so that it is parallel to the ground. Activation of the telescoping support member 210 is performed when the telescoping extension member 42 is to be extended. Alternatively, the telescoping support member 210 may be activated as soon as the housing 40 is lowered to the ground, but the extension of the telescoping support member is timed with the extension of the telescoping extension member 42.

As the telescoping support member 210 is being extended, coupling devices 224 carried by the telescoping support member 210 are respectively attached to a cable 226, and the other end of each cable is attached to another coupling device 228 which attaches to the telescoping support member 210. The coupling devices 224 coupled to the telescoping extension member 42 are electro-magnetically operated, as readily appreciated by those skilled in the art. When the telescoping extension member 42 is to be returned to the retracted position, the coupling devices 224 are decoupled therefrom.

Another aspect of the, present invention is to store the telescoping extension member along the side of the trailer 30b, and to position the safety reflectors 44 on the ground, the telescoping extension member 42 is extended parallel to the ground. Then coupling devices are used to lower the safety reflectors to the ground. Once the safety reflectors 44 are on the ground, the telescoping extension member 42 is returned to the retracted position. To remove the safety reflectors 44 from the ground, the operations as just described are reversed.

Yet another aspect of the invention is direct to a method for operating the safety warning system 30 as described above. The method comprises stopping the vehicle 30, and then operating the telescoping extension member 42 from the retracted position to the extended position based upon the controller 22. The safety reflectors 44 are spaced apart along the ground when the telescoping extension member 42 is in the extended position so that the safety reflectors are visible to oncoming traffic.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A safety warning system for a vehicle comprising:
   a safety apparatus carried by the vehicle comprising
      a housing to be mounted at a rear of the vehicle,
      at least one telescoping extension member carried by said housing, said at least one telescoping extension member having a retracted position for storage within said housing and an extended position for extending rearward of the vehicle along the ground,
      a plurality of safety reflectors carried by said at least one telescoping extension member, said plurality of safety reflectors being spaced apart along the ground rearward of the vehicle when said at least one telescoping extension member is in the extended position so that said plurality of safety reflectors are visible to oncoming traffic; and
   a controller for operating said safety apparatus including operating said at least one telescoping extension member between the retracted position and the extended position.

2. A safety warning system according to claim 1, wherein said controller is in a passenger area of the vehicle.

3. A safety warning system according to claim 1, wherein said safety apparatus further comprises:
   a support frame connected to the vehicle; and
   at least one lowering device connected to said support frame for lowering said housing to the ground prior to said at least one telescoping extension member being placed in the extended position, said at least one lowering device operating in response to said controller.

4. A safety warning system according to claim 3, wherein said housing is enclosed and includes a door; and wherein said safety apparatus further comprises a door opening device within said housing that operates in response to said controller for opening said door to expose said at least one telescoping extension member.

5. A safety warning system according to claim 3, wherein said safety apparatus further comprises a warning indicator carried by said housing for providing an audible warning indicating that said housing is to be lowered to the ground.

6. A safety warning system according to claim 1, wherein said at least one telescoping extension member comprises a single telescoping extension member; wherein said plurality of safety reflectors include a plurality of inner-positioned safety reflectors and an outer-positioned safety reflector, and said outer-positioned safety reflector is attached to an end of said at least one telescoping extension member and comprises at least one roller for assisting in travel thereof along the ground.

7. A safety warning system according to claim 6, wherein said telescoping extension member comprises a plurality of telescoping sections, each telescoping section extending from a previous telescoping section except for a first telescoping section; and wherein each inner-positioned safety reflector has an opening so that at least one of said telescoping sections extends therethrough, and a size of each opening corresponds to a size of a particular telescoping section so that as said telescoping extension member is placed in the extended position, the plurality of inner-positioned safety reflectors are spaced a predetermined distance apart along the ground.

8. A safety warning system according to claim 1, wherein said at least one telescoping extension member comprises a pair of telescoping extension members; and wherein said plurality of safety reflectors are carried by said pair of telescoping extension members.

9. A safety warning system according to claim 8, further comprising a skid plate connected to ends of said pair of telescoping extension members for assisting in travel thereof along the ground.

10. A safety warning system according to claim 9, further comprising a belt attached to said skid plate and extending between said pair of telescoping extension members; and wherein said plurality of safety reflectors are on said belt when said pair of telescoping extension members is in the extended position.

11. A safety warning system according to claim 10, wherein said safety apparatus further comprises at least one roller carried by said housing for storing said belt thereon when said pair of telescoping extension members is in the retracted position; and wherein said plurality of safety reflectors are stored in said housing in an accordion-like fashion.

12. A safety warning system according to claim 1, further comprising a telescoping support member carried by the vehicle, said telescoping support member having a retracted position for storage and an extended position, said telescoping support member comprising at least one coupling member for coupling to said at least one telescoping extension member so that said at least one telescoping extension member travels in a predetermined direction when placed in the extended position.

13. A safety warning system according to claim 1, wherein said safety apparatus further comprises an optical device carried by said housing for projecting an image of at least one safety reflector on the ground if said at least one telescoping extension member is not able to be placed in the extended position.

14. A safety warning system according to claim 1, wherein each safety reflector has a triangular shape.

15. A safety warning system according to claim 1, wherein each safety reflector comprises at least one illuminated indicia.

16. A safety warning system according to claim 1, wherein said at least one telescoping extension member operates based upon compressed air.

17. A safety warning system according to claim 1, wherein said controller operates said at least one telescoping extension member via a wireless connection.

18. A safety warning system according to claim 1, wherein said controller operates said at least one telescoping extension member via a wired connection.

19. A safety warning system for a vehicle comprising:
a housing to be mounted at a rear of the vehicle;
at least one telescoping extension member carried by said housing, said at least one telescoping extension member having a retracted position for storage within said housing and an extended position for extending rearward of the vehicle along the ground;
a plurality of safety reflectors carried by said at least one telescoping extension member; and
a controller for operating said at least one telescoping extension member between the retracted position and the extended position.

20. A safety warning system according to claim 19, wherein said controller is in a passenger area of the vehicle.

21. A safety warning system according to claim 19, further comprising:
a support frame connected to the vehicle; and
at least one lowering device connected to said support frame for lowering said housing to the ground in response to said controller.

22. A safety warning system according to claim 21, wherein said housing is enclosed and includes a door; and further comprising a door opening device within said housing that operates in response to said controller for opening said door.

23. A safety warning system according to claim 19, wherein said at least one telescoping extension member comprises a single telescoping extension member; wherein said plurality of safety reflectors include a plurality of inner-positioned safety reflectors and an outer-positioned safety reflector, and said outer-positioned safety reflector is attached to an end of said at least one telescoping extension member and comprises at least one roller for assisting in travel thereof along the ground.

24. A safety warning system according to claim 23, wherein said telescoping extension member comprises a plurality of telescoping sections, each telescoping section extending from a previous telescoping section except for a first telescoping section; and wherein each inner-positioned safety reflector has an opening so that at least one of said telescoping sections extends therethrough, and a size of each opening corresponds to a size of a particular telescoping section so that as said telescoping extension member is placed in the extended position, the plurality of inner-positioned safety reflectors are spaced a predetermined distance apart along the ground.

25. A safety warning system according to claim 19, wherein said at least one telescoping extension member comprises a pair of telescoping extension members; and wherein said plurality of safety reflectors are carried by said pair of telescoping extension members.

26. A safety warning system according to claim 25, further comprising a skid plate connected to ends of said pair of telescoping extension members for assisting in travel thereof along the ground.

27. A safety warning system according to claim 26, further comprising a belt attached to said skid plate and extending between said pair of telescoping extension members; and wherein said plurality of safety reflectors are on said belt when said pair of telescoping extension members is in the extended position.

28. A method for operating a safety warning system for a vehicle comprising a housing to be mounted at a rear of the vehicle, at least one telescoping extension member carried by the housing and having a retracted position for storage within the housing and an extended position for extending rearward of the vehicle along the ground, a plurality of safety reflectors carried by the at least one telescoping extension member, and a controller external the housing, the method comprising:

stopping the vehicle; and operating the at least one telescoping extension member from the retracted position to the extended position based upon the controller the plurality of safety reflectors being spaced apart rearward of the vehicle along the ground when the at least one telescoping extension member is in the extended position so that the plurality of safety reflectors are visible to oncoming traffic.

29. A method according to claim 28, wherein the controller is in a passenger area of the vehicle.

30. A method according to claim 28, wherein the safety warning system further comprises a support frame connected to the vehicle, and at least one lowering device connected to the support frame; the method further comprising:

lowering the housing to the ground prior to the at least one telescoping extension member being placed in the extended position, the at least one lowering device operating in response to the controller.

31. A method according to claim 30, wherein the housing is enclosed and includes a door; and the safety warning system further comprises a door opening device within the housing; the method further comprising:

operating the door opening device based upon the controller for opening the door to expose the at least one telescoping extension member.

32. A method according to claim 30, wherein the safety warning system further comprises a warning indicator carried by the housing for providing an audible warning indicating that the housing is to be lowered to the ground.

33. A method according to claim 28, wherein the at least one telescoping extension member comprises a single telescoping extension member; wherein the plurality of safety reflectors include a plurality of inner-positioned safety reflectors and an outer-positioned safety reflector, and the outer-positioned safety reflector is attached to an end of the at least one telescoping extension member and comprises at least one roller for assisting in travel thereof along the ground.

34. A method according to claim 33, wherein the telescoping extension member comprises a plurality of telescoping sections, each telescoping section extending from a previous telescoping section except for a first telescoping section; and wherein each inner-positioned safety reflector has an opening so that at least one of the telescoping sections extend therethrough, and a size of each opening corresponds to a size of a particular telescoping section so that as the telescoping extension member is placed in the extended position, the plurality of inner-positioned safety reflectors are spaced a predetermined distance apart along the ground.

35. A method according to claim 28, wherein the at least one telescoping extension member comprises a pair of telescoping extension members; and wherein the plurality of safety reflectors are carried by the pair of telescoping extension members.

36. A method according to claim 35, wherein the safety warning system further comprises a skid plate connected to ends of the pair of telescoping extension members for assisting in travel thereof along the ground.

37. A method according to claim 36, wherein the safety warning system further comprises a belt attached to the skid plate and extending between the pair of telescoping extension members; and wherein the plurality of safety reflectors are on the belt when the pair of telescoping extension members is in the extended position.

38. A method according to claim 28, wherein the safety warning system further comprises a telescoping support member carried by the vehicle, the telescoping support member having a retracted position for storage and an extended position, the telescoping support member comprising at least one coupling member for coupling to the at least one telescoping extension member so that the at least one telescoping extension member travels in a predetermined direction when placed in the extended position.

39. A method according to claim 28, wherein the safety warning system further comprises an optical device carried by the housing for projecting an image of at least one safety reflector on the ground.

* * * * *